(12) United States Patent
Boldt et al.

(10) Patent No.: US 12,537,745 B2
(45) Date of Patent: Jan. 27, 2026

(54) MANAGING FAULTS IN A TELECOMMUNICATIONS NETWORK

(71) Applicant: Telefonaktiebolaget LM Ericsson (publ), Stockholm (SE)

(72) Inventors: Gunnar Martin Andreas Boldt, Ronneby (SE); Selim Ickin, Stocksund (SE); Valentin Kulyk, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 220 days.

(21) Appl. No.: 18/013,135

(22) PCT Filed: Jun. 29, 2020

(86) PCT No.: PCT/EP2020/068305
§ 371 (c)(1),
(2) Date: Dec. 27, 2022

(87) PCT Pub. No.: WO2022/002357
PCT Pub. Date: Jan. 6, 2022

(65) Prior Publication Data
US 2023/0275799 A1     Aug. 31, 2023

(51) Int. Cl.
*H04L 41/147* (2022.01)
*H04L 41/0604* (2022.01)
(Continued)

(52) U.S. Cl.
CPC ........ *H04L 41/147* (2013.01); *H04L 41/0622* (2013.01); *H04L 41/0654* (2013.01); *H04L 41/149* (2022.05)

(58) Field of Classification Search
CPC ............. H04L 41/0622; H04L 41/0654; H04L 41/147
See application file for complete search history.

(56) References Cited

U.S. PATENT DOCUMENTS 6,446,123 B1 * 9/2002 Ballantine ........... H04L 41/5009
709/224
6,604,208 B1     8/2003 Gosselin et al.
(Continued)

FOREIGN PATENT DOCUMENTS

EP     1787449 A1     5/2007
TW     I684139 B      2/2020
(Continued)

OTHER PUBLICATIONS

International Search Report and Written Opinion of the International Searching Authority, PCT/EP2020/068305, mailed Mar. 23, 2021, 17 pages.
(Continued)

*Primary Examiner* — Chris Parry
*Assistant Examiner* — Dixon F Dabipi
(74) *Attorney, Agent, or Firm* — Sage Patent Group (57) ABSTRACT

A method performed by a node in a telecommunications network for managing faults includes obtaining predictions of faults in the telecommunications network and time intervals in which the faults are predicted to occur. The method then includes determining possible actions that could be performed to address the predicted faults and associated resource usages to perform the possible actions, and selecting actions to perform, from the possible actions, in order to address the predicted faults, based on the predicted time intervals and the determined resource usages.

19 Claims, 6 Drawing Sheets

(51) Int. Cl.
*H04L 41/0654* (2022.01)
*H04L 41/149* (2022.01)

(56) References Cited

U.S. PATENT DOCUMENTS

| | | | |
|---|---|---|---|
| 8,978,012 B1 * | 3/2015 | Poole | G06F 11/0748 |
| | | | 717/124 |
| 9,716,633 B2 | 7/2017 | PremKumar et al. | |
| 10,313,179 B1 * | 6/2019 | Douberly | H04L 41/06 |
| 10,339,131 B1 * | 7/2019 | Dolas | G06F 16/182 |
| 2015/0189564 A1 * | 7/2015 | Duan | H04W 76/11 |
| | | | 455/435.2 |
| 2016/0299937 A1 * | 10/2016 | Crockett | G06F 16/1873 |
| 2017/0353991 A1 * | 12/2017 | Tapia | H04W 24/02 |
| 2019/0130580 A1 * | 5/2019 | Chen | G06V 10/82 |
| 2019/0278651 A1 * | 9/2019 | Thornley | G06F 11/0787 |
| 2019/0327130 A1 | 10/2019 | Huang et al. | |
| 2020/0112489 A1 * | 4/2020 | Scherger | G06F 11/3409 |
| 2020/0162342 A1 * | 5/2020 | Fattu | H04L 41/16 |
| 2020/0236008 A1 * | 7/2020 | Safavi | H04L 41/149 |

FOREIGN PATENT DOCUMENTS

| | | | | |
|---|---|---|---|---|
| WO | WO-0117169 A2 * | 3/2001 | | H04L 41/0213 |
| WO | WO 2021/017169 A1 | 3/2021 | | |
| WO | WO 2021/190760 A1 | 9/2021 | | |

OTHER PUBLICATIONS

A. Snow et al., "Assessing Dependability of Wireless Networks using Neural Networks", IEEE Military Communications Conference, 2005, vol. 5, 7 pages.

H. Farooq et al., "Continuous Time Markov Chain Based Reliability Analysis for Future Cellular Networks," 2015 IEEE Global Communications Conference (GLOBECOM), 2015, 6 pages.

H. W. Kuhn, "Variants of the Hungarian Method for Assignment Problems", Naval Research Logistics Quarterly, Dec. 1956, vol. 3, Issue 4, 6 pages.

O. P. Kogeda et al., "A Probabilistic Approach To Faults Prediction in Cellular Networks", IEEE Proceedings of the International Conference on Networking, International Conference on Systems and International Conference on Mobile Communications and Learning Technologies, 2006, 6 pages.

R. Boutaba et al., "A comprehensive survey on machine learning for networking: evolution, applications and research opportunities", Journal of Internet Services and Applications, 2018, vol. 9, Article No. 16, 99 pages.

S. Rao, "Operational Fault Detection in cellular wireless base-stations", IEEE Transactions on Network and Service Management, Apr. 2006, vol. 3, No. 2, 11 pages.

Y. Kumar et al., "Fault prediction and reliability analysis in a real cellular network," 2017 13th International Wireless Communications and Mobile Computing Conference (IWCMC), 2017, 6 pages.

* cited by examiner

MANAGING FAULTS IN A TELECOMMUNICATIONS NETWORK

CROSS REFERENCE TO RELATED APPLICATIONS

This application is a 35 U.S.C. § 371 national stage application of PCT International Application No. PCT/EP2020/068305 filed on Jun. 29, 2020, the disclosure and content of which is incorporated by reference herein in its entirety.

TECHNICAL FIELD

This disclosure relates to methods, nodes and systems in a communications network. More particularly but non-exclusively, the disclosure relates to managing faults in a telecommunications network.

BACKGROUND

In an ever more digitized and connected world the importance of cellular networks is continuously increasing as a basis for numerous internet-related services. The underlying core telecom systems often have very high reliability and availability requirements that may be hard to meet. As demands on such networks increase so does the complexity of these systems, which results in an increased need for efficient and reliable network alarm and fault management processes. The context of the disclosure herein is generally within cellular base stations, where, for example, an alarm may relate to an internal fault that could lead to the inability of a cellular base station to perform its required functions.

An example of fault prediction in a telecommunications network using a machine learning model is given in the paper by Kumar, Y., Farooq, H., & Imran, A. entitled: "Fault prediction and reliability analysis in a real cellular network"; as published in the 13th International Wireless Communications and Mobile Computing Conference (IWCMC), pp. 1090-1095, 2017.

SUMMARY

As noted above, fault handling is increasingly important in telecommunications networks in order to maintain high availability and reliability requirements. Up until recently, fault handling has generally focussed on reactive approaches, e.g. methods that inform human operators on problems that have already occurred within a system.

In addition to reactive methods there is also a need for complementary proactive approaches that make use of e.g. intelligent models to predict base station alarms. Such a proactive approach could be used as an early-warning system to highlight to human operators that the system is behaving in a manner that makes it probable (to various degrees) that a system alarm is about to occur within a pre-defined interval of time ahead. However, such strategies introduce a trade-off between prediction accuracy and resource usage associated with an alarm that does occur, e.g. the resource usage associated with the alarm occurring and impacting base station performance, compared to the resource usage associated with executing pre-emptive actions either remotely or by dispatching service personnel to the base-station. Furthermore, resources for maintaining large numbers of alarms can be limited. It is thus an object of embodiments herein to improve on methods for managing alarms in telecommunications systems.

Thus according to a first aspect herein there is a method performed by a node in a telecommunications network for managing faults. The method comprises obtaining predictions of faults in the telecommunications network and time intervals in which the faults are predicted to occur. The method then comprises determining possible actions that could be performed to address the predicted faults and associated resource usages to perform the possible actions. The method then comprises selecting actions to perform, from the possible actions, in order to address the predicted faults, based on the predicted time intervals and the determined resource usages.

Thus in this way, embodiments herein provide a manner in which to select actions in order to pro-actively address faults. Whether an action is selected (e.g. and subsequently actioned) is based on when the associated faults are predicted to occur and the resource usages required to perform the action. This allows faults to be proactively managed in view of time and resource constraints. Proactively managing faults leads to a more reliable telecommunications network.

According to a second aspect there is a node in a telecommunications network for managing faults. The node comprises a memory comprising instruction data representing a set of instructions, and a processor configured to communicate with the memory and to execute the set of instructions. The set of instructions, when executed by the processor, cause the processor to: obtain predictions of faults in the telecommunications network and time intervals in which the faults are predicted to occur; determine possible actions that could be performed to address the predicted faults and associated resource usages to perform the possible actions; and select actions to perform, from the possible actions, in order to address the predicted faults, based on the predicted time intervals and the determined resource usages.

According to a third aspect there is a node in a telecommunications network for managing faults. The node comprises a first module for obtaining predictions of faults in the telecommunications network and time intervals in which the faults are predicted to occur. The node further comprises a second module for determining possible actions that could be performed to address the predicted faults and associated resource usages to perform the possible actions. The node further comprises a third module for selecting actions to perform, from the possible actions, in order to address the predicted faults, based on the predicted time intervals and the determined resource usages.

According to a fourth aspect there is a telecommunications system comprising a first node; and a plurality of other nodes. The first node is configured to: obtain predictions of faults in the other nodes and time intervals in which the faults are predicted to occur; determine possible actions that could be performed to address the predicted faults and associated resource usages to perform the possible actions; select actions to perform, from the possible actions, in order to address the predicted faults, based on the predicted time intervals and the determined resource usages; and initiate performance of the selected actions at the plurality of other nodes in order to proactively address the associated predicted faults.

According to a fifth aspect there is a computer program comprising instructions which, when executed on at least one processor, cause the at least one processor to carry out the method of the first aspect.

According to a sixth aspect there is a computer program product comprising non transitory computer readable media having stored thereon a computer program according to the fifth aspect.

BRIEF DESCRIPTION OF THE DRAWINGS

For a better understanding and to show more clearly how embodiments herein may be carried into effect, reference will now be made, by way of example only, to the accompanying drawings, in which.

DETAILED DESCRIPTION

The disclosure herein relates to a telecommunications network (or communications network). A communications network may comprise any one, or any combination of: a wired link (e.g. ASDL) or a wireless link such as Global System for Mobile Communications (GSM), Wideband Code Division Multiple Access (WCDMA), Long Term Evolution (LTE), WiFi, or Bluetooth wireless technologies. The skilled person will appreciate that these are merely examples and that the communications network may comprise other types of links. A wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Figure 1:
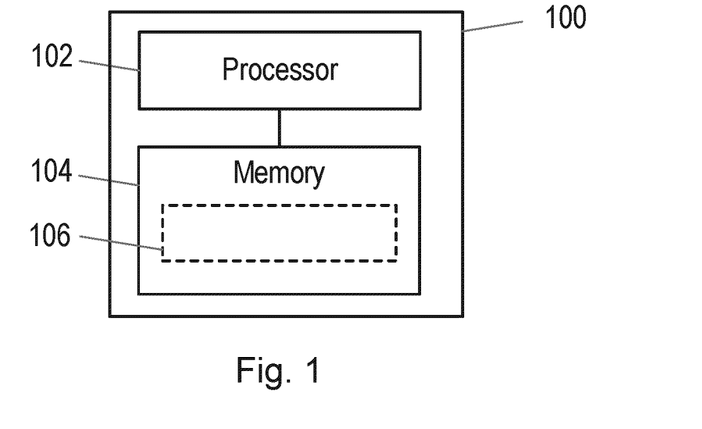
FIG. 1 shows a node according to some embodiments herein.

FIG. 1 illustrates a node 100 in a telecommunications network according to some embodiments herein. The node 100 is configured (e.g. adapted or programmed) to perform any of the embodiments of the method 200 as described below.

Generally, the node 100 may comprise any component or network function (e.g. any hardware or software module) in the communications network suitable for performing the functions described herein. For example, a node may comprise equipment capable, configured, arranged and/or operable to communicate directly or indirectly with a UE (such as a wireless device) and/or with other network nodes or equipment in the communications network to enable and/or provide wireless or wired access to the UE and/or to perform other functions (e.g., administration) in the communications network. Examples of nodes include, but are not limited to, access points (APs) (e.g., radio access points), base stations (BSs) (e.g., radio base stations, Node Bs, evolved Node Bs (eNBs) and NR NodeBs (gNBs)). Further examples of nodes include but are not limited to core network functions such as, for example, core network functions in a Fifth Generation Core network (5GC).

The node 100 may be configured or operative to perform the methods and functions described herein, such as the method 200 described below. The node 100 may comprise a processor (e.g. processing circuitry or logic) 102. It will be appreciated that the node 100 may comprise one or more virtual machines running different software and/or processes. The node 100 may therefore comprise one or more servers, switches and/or storage devices and/or may comprise cloud computing infrastructure or infrastructure configured to perform in a distributed manner, that runs the software and/or processes.

The processor 102 may control the operation of the node 100 in the manner described herein. The processor 102 can comprise one or more processors, processing units, multi-core processors or modules that are configured or programmed to control the node 100 in the manner described herein. In particular implementations, the processor 102 can comprise a plurality of software and/or hardware modules that are each configured to perform, or are for performing, individual or multiple steps of the functionality of the node 100 as described herein.

The node 100 may comprise a memory 104. In some embodiments, the memory 104 of the node 100 can be configured to store program code or a set of instructions 106 that can be executed by the processor 102 of the node 100 to cause the processor 102 to perform the functionality described herein. Alternatively or in addition, the memory 104 of the node 100, can be configured to store any requests, resources, information, data, signals, or similar that are described herein. The processor 102 of the node 100 may be configured to control the memory 104 of the node 100 to store any requests, resources, information, data, signals, or similar that are described herein.

It will be appreciated that the node 100 may comprise other components in addition or alternatively to those indicated in FIG. 1. For example, in some embodiments, the node 100 may comprise a communications interface. The communications interface may be for use in communicating with other nodes in the communications network, (e.g. such as other physical or virtual nodes). For example, the communications interface may be configured to transmit to and/or receive from other nodes or network functions requests, resources, information, data, signals, or similar. The processor 102 of node 100 may be configured to control such a communications interface to transmit to and/or receive from other nodes or network functions requests, resources, information, data, signals, or similar.

Briefly, in one embodiment, the node 100 may be configured to obtain predictions of faults in the telecommunications network and time intervals in which the faults are predicted to occur, determine possible actions that could be performed to address the predicted faults and associated resource usages to perform the actions, and select actions to perform, from the possible actions, in order to address the predicted faults, based on the predicted time intervals and the determined resource usages.

Figure 2:
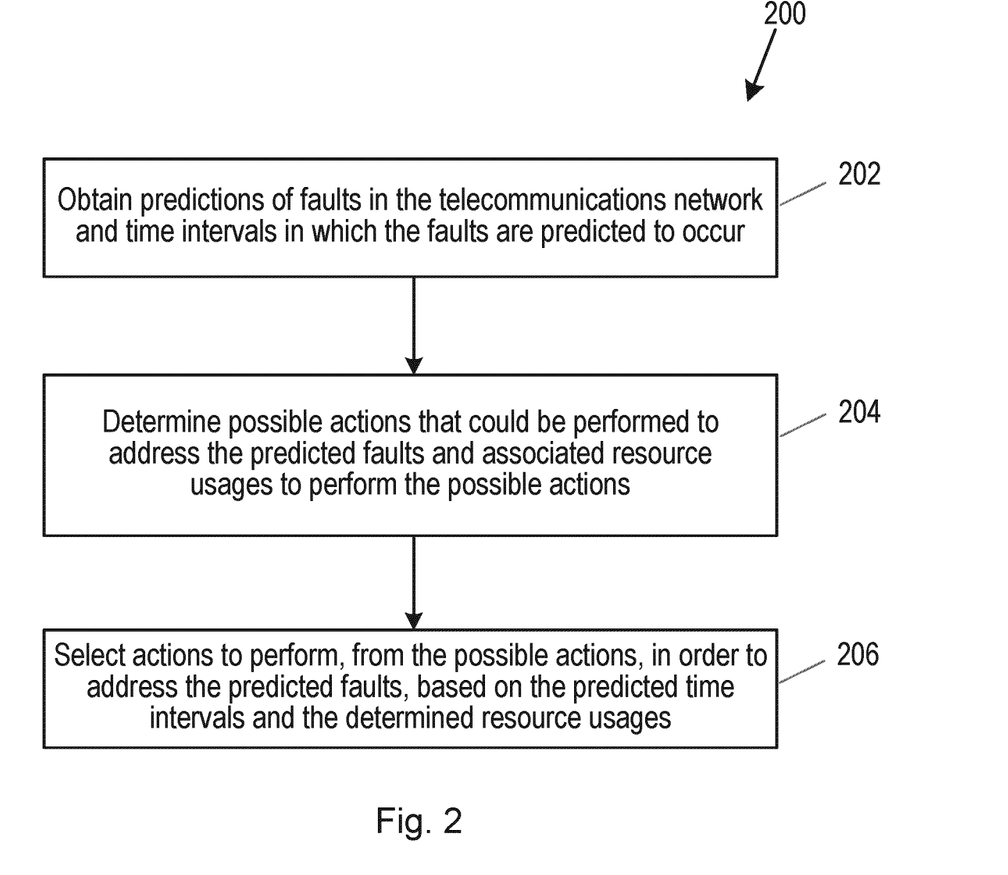
FIG. 2 illustrates a method according to some embodiments herein.

FIG. 2 illustrates a computer implemented method 200 in a node in a communications network for managing faults according to some embodiments herein. The method may be performed by a node such as the node 100 shown in FIG. 1.

Briefly, in a first step the method comprises obtaining 202 predictions of faults in the telecommunications network and time intervals in which the faults are predicted to occur. In a second step the method comprises determining 204 possible actions that could be performed to address the predicted faults and associated resource usages to perform the possible actions. In a third step the method comprises selecting 206 actions to perform, from the possible actions, in order to address the predicted faults, based on the predicted time intervals and the determined resource usages.

Thus in this way, as noted above, embodiments herein provide a manner in which to select actions in order to pro-actively address faults. Whether an action is selected (e.g. and subsequently actioned) is based on when the associated faults are predicted to occur and the resource usages required to perform the action. This allows faults to be proactively managed in view of time and resource constraints. Proactively managing faults leads to a more reliable telecommunications network.

In more detail, the telecommunications network may comprise any of the telecommunications networks described above. The node may comprise any of the nodes described above with respect to FIG. 1 and the node 100.

In some embodiments in step 202 the predictions may comprise predictions of faults that are predicted to occur in the telecommunications network, e.g. at a future point in time. Faults may comprise any type of fault that may occur in a telecommunications system. For example the faults may be associated with base stations (e.g. cellular faults), e.g. alarms relating to a malfunction in a base station or any other equipment in the telecommunications network. Examples of faults that may be predicted include, but are not limited to: site or sector down events, hardware failures, heartbeat failures, power disruptions and power failures.

The faults may be associated with time intervals in which the faults are predicted to occur. For example, the faults may be obtained in the form of a tuple comprising details of a prediction of a fault and a time or time interval in which the fault is predicted to occur. In other words, for each predicted fault, a time interval may also be obtained, describing when the fault is predicted to occur (e.g. relative to the present time). It is noted that more than one fault may be predicted in any given time interval, or in other words a time interval may be associated with more than one fault. The faults may be predicted for different time intervals, (or predict-ahead times, or fault horizons) e.g. the predictions may be made for faults that are predicted to occur at time intervals ranging from 10 minutes to 36 hours or more.

In some embodiments step 202 may comprise obtaining the predictions from another node or nodes in the telecommunications network. For example, the node 100 may request and receive predictions from the other node(s). In other embodiments the node 10 may predict one or more of the faults itself. For example, the method 200 may comprise predicting the faults (e.g. using one or more models).

In some embodiments, the predictions may be based on a plurality of network performance measures, such as performance metrics (PMs). In some embodiments, the predictions may be based on information relating to previous faults, information relating to actions performed in response to previous faults (e.g. previous maintenance actions), and/or information relating to configuration (e.g. configuration settings or changes thereto) of the telecommunications network.

The predictions may be made using one or more models for predicting faults. In some embodiments machine learning (ML) models (e.g. models trained using a machine learning process) may be used to make the predictions of the faults. The skilled person will be familiar with machine learning and machine learning models, however examples of models that may be trained to predict faults in a telecommunications network include, but are not limited to neural network models such as deep neural network models, support vector machines (SVMs), random forest models and exponential regression models. An example of fault prediction in a telecommunications network using a machine learning model is given in the paper by Kumar, Y., Farooq, H., & Imran, A., as referenced above.

A machine learning model may take as input any of the parameters above, such as, for example, network performance measures, PMs, the information relating to previous faults, information relating to actions performed in response to previous faults and/or information relating to configuration in the telecommunications network. The machine learning model may provide as output a prediction (or predictions) of a fault and/or a timescale on which the fault is predicted to occur (e.g. a number of minutes, hours or days etc.)

In some embodiments different models may be used to predict faults on different timescales. In other words, there may be multiple models trained for multiple prediction time intervals. Alternatively, a single model may be trained to output predictions of faults on different timescales (or predict ahead times). It is noted that models trained for different time intervals may have different accuracy and/or uncertainty levels associated with their predictions.

In one embodiment, the predictions of faults may be made using a ML model generated by a learning algorithm that is trained on performance metrics (PM) from cellular base stations. PM data contains 271 features/columns and values of the PM data may be collated into a training dataset. The training data set may comprise values of PM data at different time intervals before an alarm. The ground truth may comprise an indication of when the alarm occurred after collection of the PM data, and/or details of the type of alarm that occurred. The ML model may then be trained to find patterns involving combinations of the PM features that could be used to predict an upcoming alarm (in the future). The skilled person will be familiar with methods for training a ML model using training data (for example, back-propagation, gradient descent etc.). In this way, based on historical PM data from cellular base stations, a fault prediction model may be created. In an experiment, a data set containing 271 internal performance measures from cellular base stations (4G) was correlated with a data set containing base station alarms. A machine learning algorithm (Random Forest) was used to predict future base station alarms. The evaluation results indicated that is possible to predict sector down alarms one (1) hour in advance with a precision of 0.812 (+/−0.022, 95% confidence interval), recall of 0.619 (+/−0.027) and F1-score of 0.702 (0.022).

Turning now to step 204, as noted above, the method comprises determining 204 possible actions that could be performed to address the predicted faults and associated resource usages to perform the possible actions.

As used herein, an action may comprise any action (e.g. intervention) that may be performed in advance of a predicted fault in order to try to prevent the fault from occurring, or to try to reduce the impact that the fault may have on the communications network. Examples of actions that may be determined include, but are not limited to: hardware repairs (e.g. an action may comprise dispatching an Engineer or service technician to a base station to make a physical repair), restarting a base station and changing a network configuration parameter.

One or more actions (e.g. alternative possible actions/solutions) may be determined for each predicted fault. The same action may be determined for more than one fault, e.g. faults of the same type may be associated with the same type of action(s). Appropriate actions may be determined, e.g. using a look up table or action space (comprising e.g. all available actions), to map between fault types and actions.

Generally, the proposed actions may be categorized based on their required time to success. For example:

Action Category 0-10: if the estimated time to perform the action is less than 10 mins.

Action Category 10-20: if the estimated time to perform the action is between 10 min and 20 mins.

Or put in more generic form: Action Category Low-High: if the estimated time of the action is between the Low and the High bounds.

Action, a, may comprise a set of {Action category 0-10, Action category 10-20, Action category 20-30, Action category 30-60, Action category 60-120, Action category 120-180, Action category 180-360, Action category 360-720, Action category 720-1440, Action category 1440-2880}, where the numbers denote minutes for prediction interval. The action category may be denoted by a.

The actions may be associated with a resource usage. For example, each possible action may be associated with a different resource usage.

As used herein a resource usage may relate to, for example, an amount of human resource needed by an engineer to perform the respective action. In some examples the resource usage may relate to a cost associated with performing the respective action. For example, a monetary cost or a network cost associated with a change in a key performance indicator in the telecommunications network (arising e.g. from performing or not performing the action), or any combination thereof.

The resource usage may comprise a relative or weighted resource usage. For example, a weighted value based on one or more of: an amount of resource that would be used to perform the action, an estimation of the resource usage that may occur or be incurred if the fault were allowed to occur (e.g. if no action were performed, or if the fault were retrospectively fixed), an estimation of resource usage performing actions in relation to faults that would not have occurred (e.g. false positive rate), and an estimation of resource usage caused by faults that occur but weren't predicted (e.g. false negative rate).

In some embodiments, step 204 may comprise determining the resource usages based on historical accuracy values of the models used to predict the faults and/or confidence values with which the respective faults were predicted. For example, the resource usage for a fault may be determined to be higher if the fault is predicted with low certainty compared to if the fault is predicted with high certainty.

Generally the resource usage for an action may be determined based on parameters including but not limited to: Estimated action time, Estimated travel time (including all necessary logistics) to the location or site where the fault is predicted to occur (and/or the geographical distance between the site to a site engineer) in the case when a site engineer is sent. Estimated problem solving time including the state of the actuator whether there are available resources or not (operations queue state), Estimated cost ($) of the action, Fuel consumption of the vehicle per km, Engineer cost per hour.

Turning now to step 206, which as noted above comprises selecting actions to perform, from the possible actions, in order to address the predicted faults, based on the predicted time intervals and the determined resource usages. Generally, actions may be selected so as to reduce the occurrence of faults and optimise resource usage, within the time constraints of when the faults are predicted to occur. In other words, in some embodiments, the step of selecting actions to perform may comprise determining an order in which the selected actions should be performed. The order may be determined so as to optimise resource usage and address the respective predicted faults before the time intervals in which the respective predicted faults are predicted to occur.

General principles which may be used to select actions include the following.

i) In some embodiments selecting actions to perform comprises selecting an action from the possible actions if the action may be performed in a timeframe that is less than the predicted time interval in which the respective fault is predicted to occur.

For example, if Estimated time to perform action<time interval in which fault is predicted to occur (prediction time to fault event). The time of day may also be taken into account, for example, an action should generally not be triggered at the rush hour if the action is risky (with low success rate or if it requires a reboot of a base station). Therefore, even if the time interval in which fault is predicted to occur is less than the time to perform the action, and with high certainty, it may be postponed to a point in time when the load on the base station is reduced.

ii) In some embodiments the step of selecting actions to perform may comprise selecting an action from the possible actions if the corresponding determined resource usage is less than a resource available to perform the action. For example, if there are sufficient engineers (or engineering resource) to perform the action, or if the resource usage needed to perform the action is less than a budgeted amount for the base station. Put another way, the step of selecting actions to perform may comprise selecting an action from the possible actions if the corresponding determined resource usage for maintaining a network element is less than a resource available to perform the action for the same network element. E.g. unit action cost<available budget for that unit. For all units. E.g., a budget allocated to fix site A might be different than the available budget to fix site B. Generally therefore, if Estimated resource to perform the action<max. allowed resource budget for action.

iii) In some embodiments the step of selecting actions to perform may comprise selecting an action from the possible actions if the corresponding determined resource usage is less than a resource usage that would be needed to fix the fault if the fault were to left to occur. In other words if the resource usage associated with proactively performing an action to prevent a fault is less than a resource action associated with retrospectively fixing the fault if it were left to occur.

Other factors that may be included in determining the resource usage include, but are not limited to:

Resource Usage of a Miss:

The amount of induced resource usage if a site failure cannot be prevented (e.g. either due to a missed prediction or with a failure of the action), some factors that are related to this resource usage are as follows: Cell load (e.g., the number of connected users in base station) is a good metric for assessing the priority, e.g., a site being located in a crowded area vs in a suburb) and this is a learnable metric from historical data (based on previous failures by quantifying how much it resource was used when a site with similar characteristics has failed previously). Importance of the site. Success rate of the action: it is not always the case that a given proactive action solves the problem in advance such that the site failure is avoided. Hence, there exists some success rate $R_{action\_success}$ that may be considered.

Prediction Accuracies:

The uncertainty (the confidence interval) of the predictions given the prediction since the prediction accuracy decreases as the ahead time of prediction till the event. F1-score: which is a function of TP (True Positive), FP (False Positive—wrong site fail predictions for no-fault cases), TN (True Negative), and False (False Negative—no-fail predictions for actual faults).

When limited resources are available, then a smart selection of the actions for each site can be executed, since some sites can tolerate rather late actions as compared to others, which depend on the site characteristics representing the state after the predictions are made for different time intervals. As an example we give two fictional scenarios, A and B. In scenario A an alarm was predicted 20 minutes in advance with uncertainty of 2%. The targeted base station is heavily loaded with users and can be physically reached by service technician since it is located close by. Thus, it could be valuable to dispatch a technician to manually fix the problem on site in order to address the upcoming alarm. In another example scenario B an alarm is predicted to occur in 4 hours, which will be at rush hour. The uncertainty is rather high at 40%. Since the base station is located far away it is not practically possible to dispatch a technician. However, since the current load on the base station is very low an option could be to remotely restart the base station, and in that way resolve the problem well before the rush hour peak.

It is noted that actions that do not satisfy one or more of the criteria above, may be filtered out (e.g. not selected). It is further noted that estimated action time and the estimated resource usage associated with an action may be learned (e.g. by a ML model) from historical data, as described below.

In some embodiments, the faults are predicted to occur at a plurality of different sites (e.g. different base stations) in the telecommunications network and wherein the step of selecting actions to perform may thus comprise selecting actions that minimise a total resource usage across the plurality of different sites.

In order to choose the right action for the sites based on the accuracy of the models, given the aforementioned metrics and constraints, the problem may be formulated by transforming the predictions (TP, TN, FN, FP used in calculating the F1-score) to a resource optimisation model.

Generally, the overall resource usage with and without the model on a set of sites may be given as follows.

$$R_{with\ model} = R_{action}(TP+FP) + R_{miss}(FN+TP(1-R_{action\_success}))$$

Note that $1-R_{action\_success}$ is equivalent to the failure rate of an action, and the failed actions will result in faults occurring and will be added to the missed faults to obtain the total number of faults.

- $R_{action}$ is the resource usage associated with an action and (as described above) can be a function of input variables such as: {fuel consumption per km, travel time, engineer time, engineer cost per hour}
- $R_{miss}$ is the resource usage associated with site failure and can be a function of input variables such as: {nr of users being affected in the case of a cell failure, site priority, terms in a service level agreement (SLA)}

Note that the equation above is a formula derived from previous prediction history (performance statistics) of the model. The resource usage per prediction (depending on the interval of the prediction) may be estimated in inference as follows.

Resource usage at each site can be different and may be formulated with a weighted summation form, where we compute the resource usage at each site separately and sum the resource usage of each site to compute the final resource usage.

Similarly, resource usage at a site, s, can be formulated as follows:

Rs, a: $R_{with\ model,s,a}$ where s: site, a: action category

Since different actions in different sites can result in different resource usages, the resource usage for a given action at each site can be different. The sum of the resource usage across all sites may be minimized.

The uncertainty in the prediction model accuracy can be different for different observation input matrix. Hence, the success of actions depends, for example, on the prediction accuracy, and that depends on the state where the state consists of Site related metrics including pm counters, connected users, Hour of the day, cell load, geographical distance from the closest available site engineer, SLA's, and the action category (since different prediction probabilities are obtained for different ahead times).

Resource Usage action vector may comprise the resource usage associated with each action category for the given site, which in this example, is a 1×10 vector, Action mask vector is a Boolean vector that tells which action category to apply. In the below example, let's say the prediction model outputs predictions (probability that the site will fail) for the 10 categories (different ahead times) as follows:

[0.8, 0.7, 0.5, 0.4, 0.7, 0.8, 0.7, 0.5, 0.4, 0.7]

If the action vector, Wa, is [0, 1, 0, 0, 0, 0, 0, 0, 0, 0], then the probability 0.7 is used and the action is given based on the corresponding threshold such that [1 if 0.7>pthreshold else 0].

Optimization Formulation:

The goal may be to minimize the total resource usage with the model-based action:

$$\min\left\{\sum_{s=0}^{N_{sites}} R_S\right\} \text{ where } Rs =$$

Action resource usage + site fail resource usage

Hence, both of the terms may be minimised (action and the site failure resource usage), simultaneously.

With this model decision the resource usage can be as follows:

For a Correct Prediction(High Accuracy and/or Confidence):
  Actual: faulty, predicted: faulty:

$$Rs = R\text{action} + R\text{miss}*(1-R\text{action success})$$

With action_success=1 then→Rs=Raction
And with low action success→Rs=Raction+Rmiss
Actual: not faulty, predicted not faulty:
Rs=0

For an Incorrect Prediction (Low Accuracy and/or Confidence):
  Actual: faulty, prediction: not faulty
    Rs=Rmiss
  Actual: not faulty, prediction: faulty
    Rs=Raction The estimated resource usage may also be scaled with the accuracy and confidence of the predictions by multiplying with a factor of K: K=f(acc, confidence) and K is low for high accuracy and or confidence, e.g., K=(1−(mean f1$_i$−variation around the mean f1$_i$) for all prediction interval I. Note that K is bounded by 0 and 1, and scaled accordingly (e.g., min−max scaler).

In such an example, the equations may become:
Rs final=Rs*K and for high confidence and accuracy the resource usage may approach zero, and for poor confidence and/or low accuracy the resource usage may be high.

Put another way, in some embodiments, selecting actions that minimise a total resource usage across the plurality of different sites may comprise selecting actions which minimise the expression:

$$\sum_{s=0}^{N_{sites}} R_S$$

wherein $N_{sites}$ comprises the (total) number of sites in the plurality of sites, and Rs comprises a total resource usage associated with a site S.

The resource usage for one site, Rs may be determined according to:

$$R_s = R_A + R_{SiteFailure},$$

wherein $R_A$ comprises a total resource usage in performing selected actions for the site, S, and $R_{SiteFailure}$ comprises a resource usage associated with failure of site S. In other words, $R_{SiteFailure}$ may comprise the resource usage associated with the consequences of site S being severely affected or being down (hence yielding poor QoE and increased churn rate). $R_{SiteFailure}$ may thus comprise poor radio coverage and degraded QoS (increased latency, and/or packet drop, and/or low throughput) associated with site failure.

$R_{SiteFailure}$ for a site, S, may be determined using a second machine learning model that takes as input a state of the respective site and/or characteristics of the respective site. The second machine learning model outputs an estimation of the resource usage associated with site failure. The second machine learning model may be trained using historical data (e.g. historical values of the input parameters and ground truth $R_{SiteFailure}$ values). In other words a second machine learning model may be trained and used to predict the resource usage associated with failure.

Other predictions of resource usages may also be made, e.g. using a third machine learning model. For example, $R_{action\_success}$ which is the probability of the action being successful and avoiding the failure given the input features (representing the site state), may also be learnt from training data comprising historical data with similar action/resource usage issues associated with different actions as input, and target variable (e.g. whether it was successful or not). Such a target variable can be an integer (1 if was successful, 0 if was not successful). A (third) supervised learning model (M) can then be trained as follows:

X={pm, action}, y={1 if successful else 0}. This additional inference model then predicts a probability of success in the range between 0 and 1.

In some embodiments, $$\sum_{s=0}^{N_{sites}} R_s$$

may be minimised using a Hungarian optimisation method. The skilled person will be familiar with Hungarian optimisation methods, which are described, for example, in the paper by Harold W. Kuhn. entitled "Variants of the Hungarian method for assignment problems" Naval Research Logistics Quarterly, 3: 253-258, 1956.

$$\sum_{s=0}^{N_{sites}} R_s$$

may be minimised, for example, according to one or more of the following constraints:
 i) a total resource usage to perform the selected actions being less than a total resource available for performing actions (for example, a resource usage to perform the selected action at a selected site being less than the available resource associated for the maintenance of that site)
 ii) a time associated with performing actions at each site being less than a predetermined time requirement for performing actions at the respective site (for example, a requirement, e.g. of a base station that says how quickly faults must be addressed e.g. to comply with a SLA) and
 iii) the selected actions comprise fewer actions than a maximum number of actions that may be performed at any given time (e.g. due to resource constrains associated with the number of Engineers available; one engineer can only work on site at any given time).

In more detail, according to one embodiment:

$$\text{Total Resource usage of Actions} = \sum_{p=0}^{N_{Positive\ Predictions\ in\ all\ sites}} R_a W_a^T;$$

where $$W_a^T$$

is a vector (1×N) containing the action mask for each action category where sum of W=1, hence there can only be one action per site at a given time interval.

Note that $R_a W_a^T$, may comprise an "element-wise" product so as to mask only the selected action per site.

Assuming the resource usage of the actions for each time interval for a site is given in the following snapshot, where action category at index 1 is chosen (action category 10-20 mins).

Ra=[0.1, 0.3, 0.6, 0.5, 0.2, 0.1, 0.4, 0.5, 0.2, 0.9], and $$W_a^T \text{ is } [0, 1, 0, 0, 0, 0, 0, 0, 0, 0]$$

Note that N=10, since there are 10 action categories. Therefore,
Constraint 1:

$$\sum_{p=0}^{N_{Positive\ Predictions\ in\ all\ sites}} R W_a^T < $$

Total action budget for a given prediction time interval.

Constraint 2: $t_{als} < T_s$ for all sites. The time, $t_{als}$ it takes for the action a, to execute at a given site must be less than the total required predefined time at site s, Ts. This may be based on the SLA, and also the priority of the site.

Constraint 3: One site engineer can do only one action at one site at a time.

Fault Resource Usage

Similarly, the resource usage associated with missed faults can also be estimated. This may be set as the target variable for a machine learning algorithm that is to be predicted. The model where the input matrix is the site state (as described above) may be trained based on the historical data since the resource usage associated with the faults can be calculated on the historical dataset (already existing faulty site observations).

The model training can be done as follows:

X: including the site state and characteristics y: the resource usage associated with the site being down A supervised ML model that is trained $M: f(X) \rightarrow y$ can be used to infer on the site to estimate the resource usage associated with site failure.

Hungarian Optimization Method to Choose the Right Action to Minimize the Total Resource Usage:

As a result of the whole process, the output of the method in this example, is a table similar to the following, where each row represents a site and the columns are the corresponding action categories. Eventually, there may be a one to one match from site to action.

The optimization algorithm used in this example is a Hungarian Optimization Method. This may be implemented, for example, using the Scipy computation package (scipy.optimize.linear_sum_assignment, available at https://docs.scipy.orq/doc/scipy/reference/qenerated/scipy.optimize.linear_sum_assignment. html).

Below is an example total resource usage (action resource usage+failure resource usage) matrix of a given site for a given action. Note that there exists a constraint that one site engineer can do one action at a timeslot (i.e., action category). As an example, we assume 3 sites and 3 available actions with different total corresponding resource usages. In this case, the resource usage can be minimized by selecting the following pairs: {(Site1, Action1), (Site2, Action2), (Site 3, Action 3)} that result in a total minimum resource usage of 1.3 (0.1+0.5+0.7).

TABLE 1

Total resource usage of applying corresponding action at a site may be given per site engineer.

| | A1 (Action 1) | A2 (Action 2) | A3 (Action 3) |
|---|---|---|---|
| Site A | 0.1 (0.07 + 0.03) | 0.2 (0.17 + 0.03) | 0.7 (0.67 + 0.03) |
| Site B | 0.4 (0.2 + 0.2) | 0.5 (0.3 + 0.2) | 1 (0.8 + 0.2) |
| Site C | 0.5 (0.2 + 0.3) | 0.6 (0.3 + 0.3) | 0.7 (0.4 + 0.3) |

Observe that the tuples represent the resource usages associated with action and the site failure, respectively. (action resource usages, failure resource usages). Note that the failure resource usage is the same for a given site, while action resource usage can be different for different sites and for different actions.

It will be appreciated that in the example above, the use of a Hungarian optimisation model is an example only, and that the skilled person will be familiar with other optimization models that could be used, such as, for example, a Simplex algorithm for linear optimization.

Turning back to the method 200, after the step 206, the method 200 may further comprising initiating performance of the selected actions in order to proactively address the respective predictive faults. For example the node 100 may send an instruction to a cellular base station instructing said base station to perform a selected action. Or the node 100 may alert/instruct a user to perform an action, such as dispatch an engineer.

Embodiments herein thus comprise methods and systems for training machine learning models for different action categories as the target variable and optimize action selection, given the constraints of sites and prediction accuracies and uncertainties, with the goal of minimizing the overall total resource usage (resource usage associated with actions+resource usage associated with missed faults) by applying the best combination of actions. The proposed approach described in this document can thus be used to advantageously provide indications of problems ahead in time as well as to recommend the right actions at the right time with optimized ordering.

Figure 3:
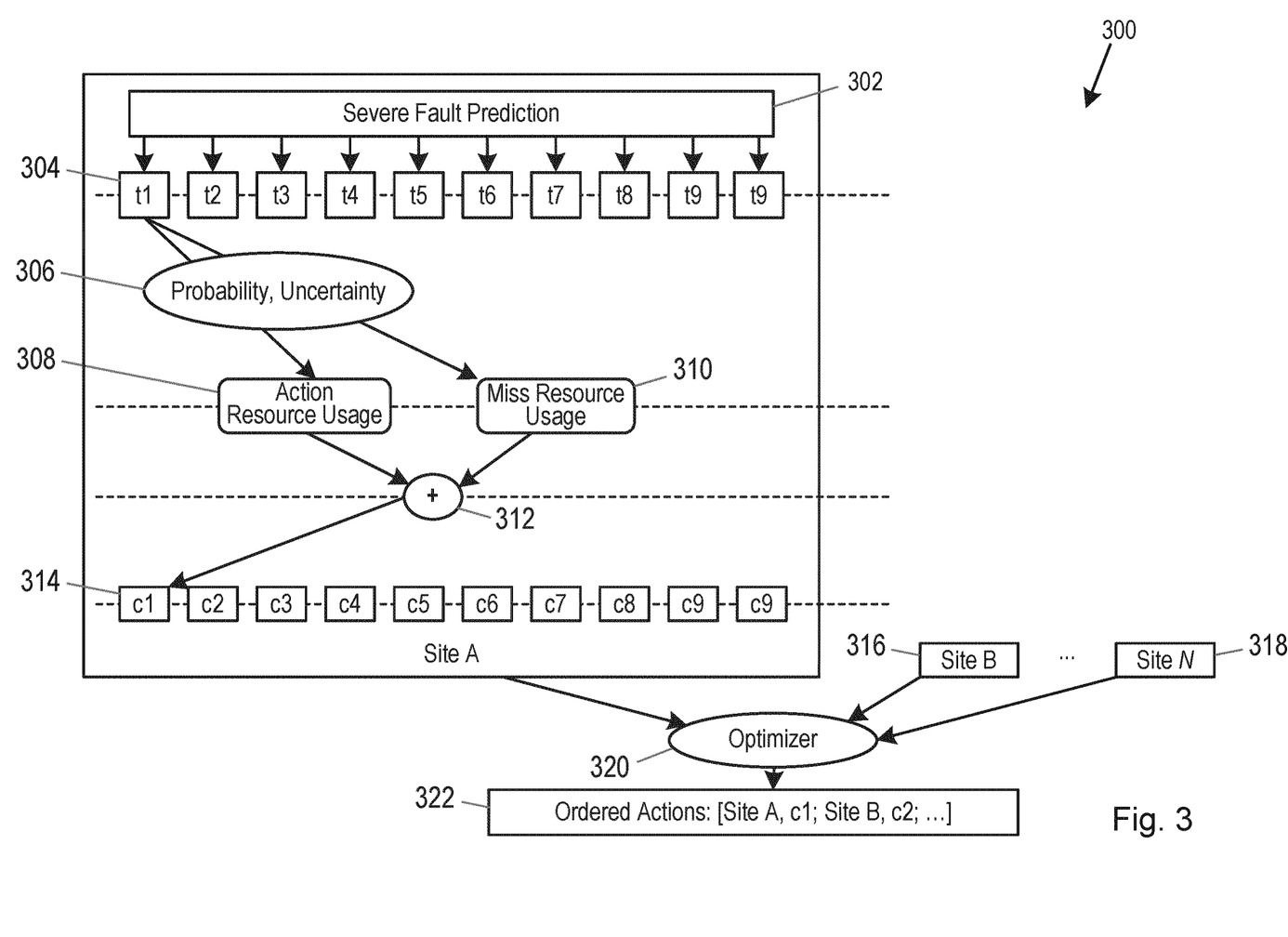
FIG. 3 illustrates a process according to some embodiments herein.

FIG. 3 illustrates an overview of a process 300 according to an embodiment herein. In this embodiment fault prediction machine learning models with different ahead times are used to predict faults 302 in the telecommunications network. As described in detail above, such machine learning models may be trained on the site performance counters in the network and radio level. There may be multiple models trained for multiple prediction time intervals. The faults are thus predicted for different time intervals t1-t9 304.

Each model trained for different time intervals may have different accuracy and uncertainty (e.g. confidence) levels 306.

Based on the uncertainty of the predicted faults and predicted probabilities 306, different actions may be proposed in order to proactively address the faults. In this embodiment, the resource usages of the actions 308 and the resource usage associated with missed predictions 310 are calculated and then they are summed 312 as a total resource usage(e.g. for each site).

Based on the resource usages c1-c9 for different models (e.g. action categories for different time intervals), an optimization algorithm 320 chooses the best action category for the given site state, bounded by a set of constraints related to the metadata of the site.

This is performed for each site B-N 316,318 and actions are selected and ordered 322 for each site so as to provide an optimised order.

Figure 4:
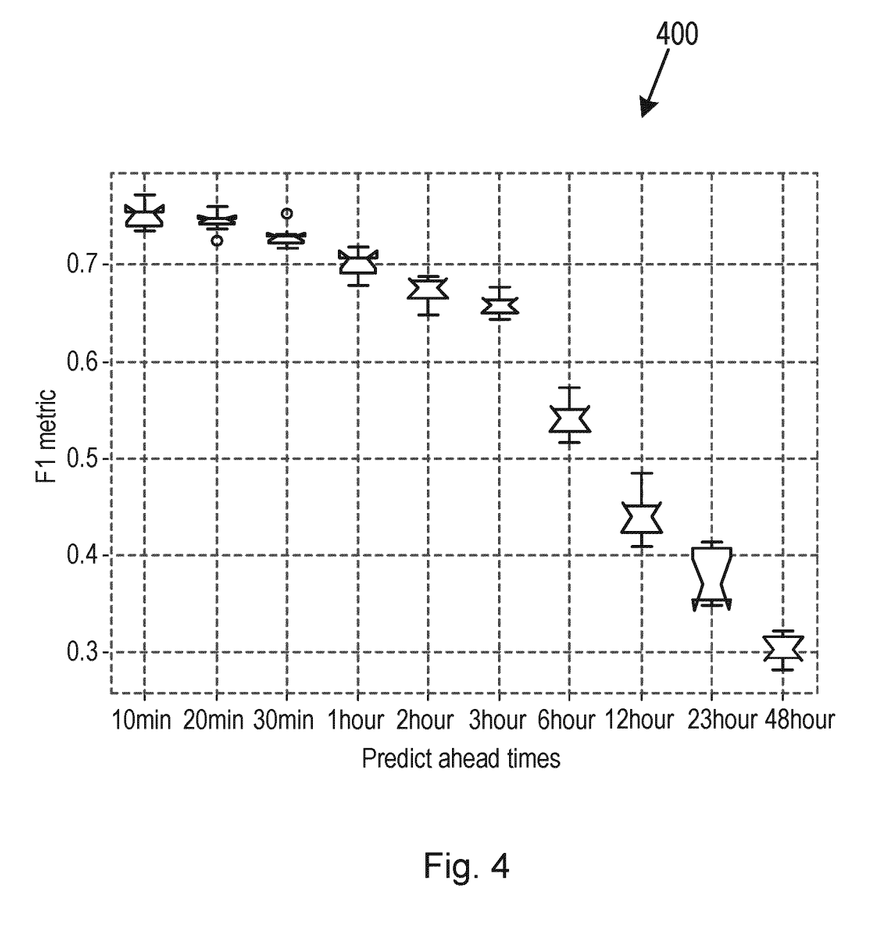
FIG. 4 illustrates a graph showing the accuracy of predicted fault times for different prediction horizons.

Turning now to FIG. 4 which illustrates a graph 400 of performance (F1 score on the y-axis) of a machine learning model for predicting faults at different time intervals (e.g. a different predict ahead times as shown on the x-axis). In this example, a supervised machine learning model was trained to predict faults using network performance counters as an input matrix, X, and the severe fault alarms that occur at different ahead times were used as target variables (e.g. ground truth values). The F1 score is used to describe the accuracy of the trained machine learning models on the test sets at predicting faults on different time intervals.

Figure 5:
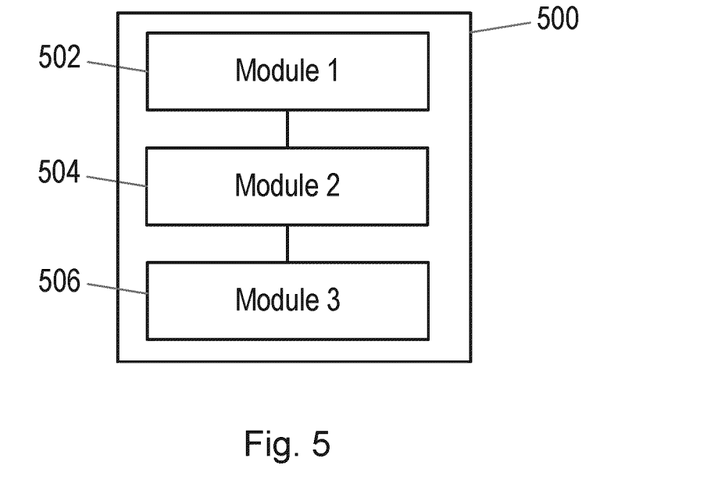
FIG. 5 illustrates a node according to some embodiments.

Turning now to FIG. 5, according to some embodiments, there is a node 500 in a telecommunications network for managing faults. The node 500 comprises a first module 502 for obtaining predictions of faults in the telecommunications network and time intervals in which the faults are predicted to occur. The node 500 further comprises a second module 504 for determining possible actions that could be performed to address the predicted faults and associated resource usages to perform the possible actions, and a third module 506 for selecting actions to perform, from the possible actions, in order to address the predicted faults, based on the predicted time intervals and the determined resource usages.

A module may comprise a computing module configured to perform the functionality of the module. For example, a module may comprise a computer code or set of instructions that may be run by a processor and cause the processor to perform the functionality of the respective module as described herein.

Steps of obtaining predictions of faults in the telecommunications network and time intervals in which the faults are predicted to occur; determining possible actions that could be performed to address the predicted faults and associated resource usages to perform the actions; and selecting actions to perform, from the possible actions, in order to address the predicted faults, based on the predicted time intervals and the determined resource usages, were all described in detail with respect to the node 100 and the method 200 as described above and the detail therein will be understood to apply equally to the node 500.

Figure 6:
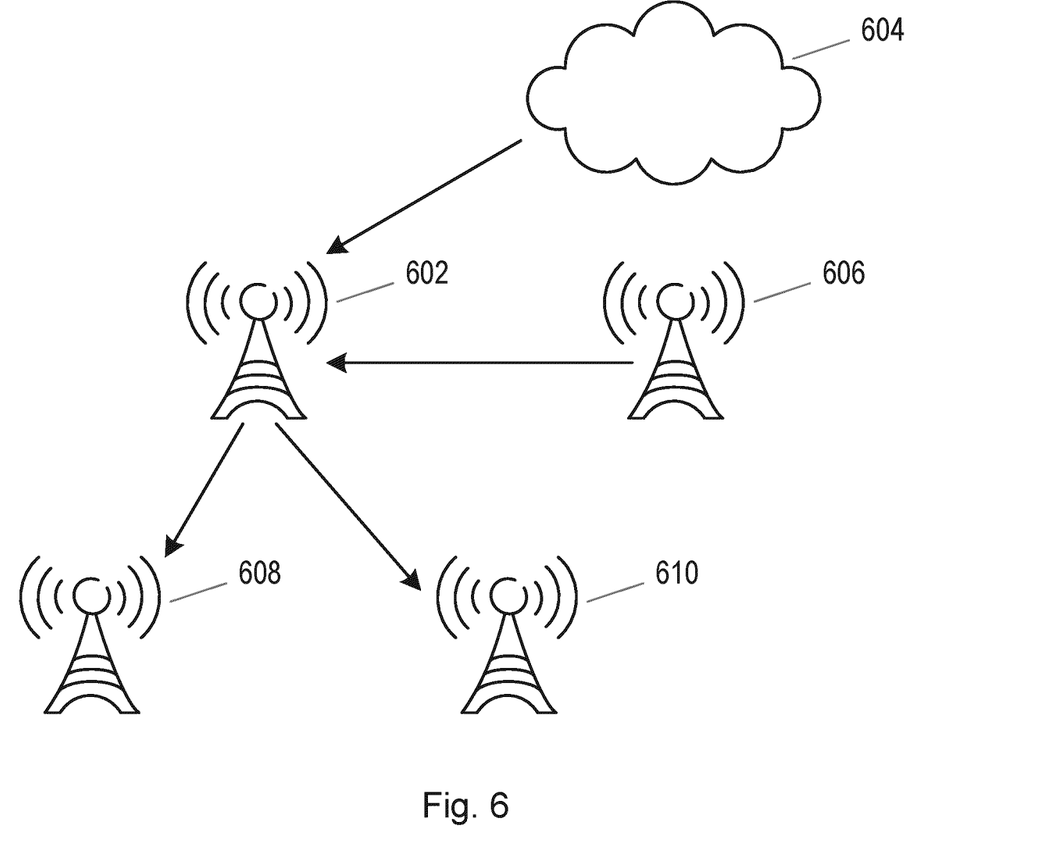
FIG. 6 illustrates a communications system according to some embodiments.

Turning now to FIG. 6, which illustrates a telecommunications network according to some embodiments herein. In this embodiment, there is a node 602 for managing faults. The node 600 may comprise a node such as the node 100 or the node 500 described above. The node 600 may perform any of the embodiments of the method 200 as described above. The node 602 may obtain predictions of faults in the telecommunications network and time intervals in which the faults are predicted to occur, for example, from other nodes in the telecommunications network such as a node 606 or a cloud computing arrangement 604. The node 602 may use the predictions to perform the steps 204 and 206 as described above to select actions in order to address the predicted faults. The node 602 may then initiate performance of the selected actions in order to proactively address the respective predictive faults, for example, by sending instructions to one or more other nodes 608, 610 to perform the actions.

Turning now to another embodiment, in some embodiments there is a computer program comprising instructions which, when executed on at least one processor, cause the at least one processor to carry out any of the methods described herein, such as the method 200. There may further be a computer program product comprising non transitory computer readable media having stored thereon the aforementioned computer program.

Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines.

The sub-routines may also comprise function calls to each other. The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method performed by a node in a telecommunications network for managing faults, the method comprising:
   obtaining predictions of faults in the telecommunications network and time intervals in which the faults are predicted to occur;
   determining possible actions that could be performed to address the predicted faults and associated resource usages to perform the possible actions, wherein the resource usages are determined based on historical accuracy values of models used to predict the faults and/or confidence values with which the respective faults were predicted, and wherein determining possible actions comprises determining a plurality of action categories based on estimated time to perform actions; and
   selecting actions to perform, from the possible actions, in order to address the predicted faults, based on the predicted time intervals and the determined resource usages, wherein selecting actions comprises selecting from the plurality of action categories based on the predicted time intervals in which the faults are predicted to occur.

2. A method as in claim 1 wherein the predictions of faults are based on a plurality of network performance measures.

3. A method as in claim 1 wherein the predictions of faults are based on one or more of:
   information relating to previous faults;
   information relating to actions performed in response to previous faults; and/or
   information relating to configuration of the telecommunications network.

4. A method as in claim 1 wherein the step of selecting actions to perform, comprises:
   determining an order in which the selected actions should be performed.

5. A method as in claim 4 wherein the order is determined so as to optimise resource usage and address the respective predicted faults before the time intervals in which the respective predicted faults are predicted to occur.

6. A method as in claim 1 wherein the step of selecting actions to perform comprises selecting an action from the possible actions if:
   the action may be performed in a timeframe that is less than the predicted time interval in which the respective fault is predicted to occur;
   the corresponding determined resource usage is less than a resource available to perform the action and/or
   the corresponding determined resource usage is less than a resource usage that would be needed to fix the fault if the fault were to left to occur.

7. A method as in claim 1 wherein the faults are predicted to occur at a plurality of different sites in the telecommunications network and wherein the step of selecting actions to perform comprises:
   selecting actions that minimise a total resource usage across the plurality of different sites.

8. A method as in claim 7 wherein the step of selecting actions that minimise a total resource usage across the plurality of different sites, comprises selecting actions which minimise the expression:

$$\sum_{s=0}^{N_{sites}} R_s$$

wherein $N_{sites}$ comprises a number of sites in the plurality of sites, and Rs comprises a total resource usage associated with a site S.

9. A method as in claim 8 wherein Rs is determined according to:

$$R_s = R_A + R_{SiteFailure},$$

wherein RA comprises a total resource usage in performing selected actions for the site, S, and $R_{SiteFailure}$ comprises a resource usage associated with failure of site S.

10. A method as in claim 9 wherein $R_{SiteFailure}$ for the site, S, is determined using a second machine learning model that takes as input a state of the respective site and/or characteristics of the respective site.

11. A method as in claim 8 wherein $$\sum_{s=0}^{N_{sites}} R_s$$

is minimised using a Hungarian optimisation method.

12. A method as in claim 8 wherein $$\sum_{s=0}^{N_{sites}} R_s$$

is minimised according to one or more of the following constraints:
   a total resource usage to perform the selected actions being less than a total resource available for performing actions;
   a time associated with performing actions at each site being less than a predetermined time requirement for performing actions at the respective site; and
   the selected actions comprising fewer actions than a maximum number of actions that may be performed at any given time.

13. A method as in claim 1 further comprising initiating performance of the selected actions in order to proactively address the respective predicted faults.

14. A method as in claim 1 wherein the resource usage relates to an amount of human resource needed by an engineer to perform the respective action.

15. A method as in claim 1 wherein the resource usage relates to a cost associated with performing the respective action.

16. A method as in claim 15 wherein the cost comprises a network cost associated with a change in a key performance indicator in the telecommunications network.

17. A node in a telecommunications network for managing faults, the node comprising:
   a memory comprising instruction data representing a set of instructions; and
   a processor configured to communicate with the memory and to execute the set of instructions, wherein the set of instructions, when executed by the processor, cause the processor to:
      obtain predictions of faults in the telecommunications network and time intervals in which the faults are predicted to occur;
      determine possible actions that could be performed to address the predicted faults and associated resource usages to perform the possible actions, wherein the resource usages are determined based on historical accuracy values of models used to predict the faults and/or confidence values with which the respective faults were predicted, and wherein determining possible actions comprises determining a plurality of action categories based on estimated time to perform actions; and
      select actions to perform, from the possible actions, in order to address the predicted faults, based on the predicted time intervals and the determined resource usages, wherein selecting actions comprises selecting from the plurality of action categories based on the predicted time intervals in which the faults are predicted to occur.

18. A node as in claim 17 wherein the predictions of faults are based on a plurality of network performance measures.

19. A telecommunications system comprising:
   a first node; and
   a plurality of other nodes,
   wherein the first node is configured to:
      obtain predictions of faults in the other nodes and time intervals in which the faults are predicted to occur;
      determine possible actions that could be performed to address the predicted faults and associated resource usages to perform the possible actions;
      select actions to perform, from the possible actions, in order to address the predicted faults, based on the predicted time intervals and the determined resource usages, wherein the resource usages are determined based on historical accuracy values of models used to predict the faults and/or confidence values with which the respective faults were predicted, and wherein determining possible actions comprises determining a plurality of action categories based on estimated time to perform actions; and initiate performance of the selected actions at the plurality of other nodes in order to proactively address the associated predicted faults, wherein selecting actions comprises selecting from the plurality of action categories based on the predicted time intervals in which the faults are predicted to occur.

* * * * *